United States Patent
Van Herpen et al.

(10) Patent No.: US 9,285,730 B2
(45) Date of Patent: Mar. 15, 2016

(54) METHOD FOR DETERMINING A CHARACTERISTIC OF A SURFACE LAYER OF A FUSER ELEMENT

(71) Applicant: OCE-TECHNOLOGIES B.V., Venlo (NL)

(72) Inventors: Wilhelmus M. Van Herpen, Velden (NL); Hassan Nnafie, Eindhoven (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 14/630,374

(22) Filed: Feb. 24, 2015

(65) Prior Publication Data

US 2015/0168891 A1    Jun. 18, 2015

Related U.S. Application Data

(63) Continuation of application No. PCT/EP2013/068257, filed on Sep. 4, 2013.

(30) Foreign Application Priority Data

Sep. 4, 2012    (EP) ................................... 12182981

(51) Int. Cl.
  *G03G 15/20*    (2006.01)
  *G03G 15/00*    (2006.01)
  *G01B 7/06*    (2006.01)

(52) U.S. Cl.
  CPC .......... *G03G 15/2039* (2013.01); *G01B 7/085* (2013.01); *G03G 15/2053* (2013.01); *G03G 15/553* (2013.01)

(58) Field of Classification Search
  CPC ................ G03G 15/2039; G03G 2215/2032; G03G 2215/2016; G03G 15/205; G03G 15/2053; G03G 15/2064; G03G 15/5041
  See application file for complete search history.

(56) References Cited

U.S. PATENT DOCUMENTS

| | | | |
|---|---|---|---|
| 5,003,325 A * | 3/1991 | Bibl | ............................. 346/136 |
| 6,370,965 B1 | 4/2002 | Knapp | |
| 2002/0024345 A1 | 2/2002 | Stein et al. | |
| 2006/0152231 A1 | 7/2006 | Konermann et al. | |
| 2007/0252718 A1 | 11/2007 | Ray | |
| 2010/0256951 A1 | 10/2010 | Konermann et al. | |
| 2011/0222894 A1 * | 9/2011 | Yamamoto et al. | ............. 399/88 |
| 2011/0299900 A1 * | 12/2011 | Yonekawa et al. | ............. 399/329 |
| 2013/0078470 A1 * | 3/2013 | Murase et al. | ............. 428/411.1 |
| 2013/0264211 A1 * | 10/2013 | Akiyama | ........................ 205/77 |

FOREIGN PATENT DOCUMENTS

JP    2003-5578 A    1/2003

* cited by examiner

*Primary Examiner* — Roy Y Yi
(74) *Attorney, Agent, or Firm* — Birch, Stewart, Kolasch & Birch, LLP

(57) ABSTRACT

The present invention relates to a method for determining a characteristic of a surface layer of a fuser element for fusing a marking material on a recording medium in a printing system. The printing system comprises a capacitive probe, which comprises a first electrode and a second electrode. The second electrode is arranged adjacent to the first electrode in order to form a capacitor. The first electrode and the second electrode are in operation both arranged adjacent to and opposing the surface layer of the fuser element. The method comprises the steps of performing a capacitive measurement on the surface layer by the first electrode and the second electrode of the capacitive probe and determining a characteristic of the surface layer based on the capacitive measurement.

12 Claims, 5 Drawing Sheets

METHOD FOR DETERMINING A CHARACTERISTIC OF A SURFACE LAYER OF A FUSER ELEMENT

CROSS REFERENCE TO RELATED APPLICATIONS

This application is a continuation of PCT International Application No. PCT/EP2013/068257, filed on Sep. 4, 2013, which claims priority under 35 U.S.C. 119(a) to Patent Application No. 12182981.6, filed in European on Sep. 4, 2012, all of which are hereby expressly incorporated by reference into the present application.

FIELD OF THE INVENTION

The present invention relates to a method for determining a characteristic of a surface layer of a fuser element for fusing a marking material on a recording medium in a printing system. The present invention further relates to a printing system comprising a fuser element and a capacitive probe for determining a characteristic of a surface layer of the fuser element.

BACKGROUND OF THE INVENTION

In a known printing system a fuser element is provided for fusing a marking material on a recording medium. The fuser element has a surface layer, which contains an elastomeric compound, configured for providing a uniform pressure to the marking material in a fusing pinch.

The surface layer of the fuser element deteriorates in operation of the printing system due to mechanical wear in the fusing pinch. As a result in the long term a characteristic of the surface layer will change. In general a thickness of the surface layer slowly decreases. Moreover the thickness of the surface layer becomes non-uniform in a direction of the fusing element during use of the fuser element, for example in a direction parallel to an extending direction of the fusing pinch.

The thickness and life time of the surface layer of the fuser element in a printing system is often predicted based on the number of images fused on recording mediums in the printing system and on a predetermined wear behavior of the fuser element. The wear behavior is predetermined by a manufacturer of the fuser element in a controlled test environment.

In practice a fuser element in a printing system is replaced earlier than necessary, as the actual thickness of the surface layer of the fuser element in the printing system also varies due to other uncontrolled parameters.

SUMMARY OF THE INVENTION

It is accordingly an object of the present invention to provide a method for determining a characteristic of a surface layer of a fuser element for fusing a marking material on a recording medium in a printing system that provides knowledge on the actual wear characteristic of the surface layer of the fuser element in the printing system.

This object is attained by a method for determining a characteristic of a surface layer of a fuser element for fusing a marking material on a recording medium in a printing system, the printing system comprising a capacitive probe comprising a first electrode and a second electrode, the second electrode being arranged adjacent to the first electrode in order to form a capacitor, the first electrode and the second electrode in operation both being arranged adjacent to and opposing the surface layer of the fuser element, the method comprising the steps of:
a) Performing a capacitive measurement on the surface layer of the fuser element by the first electrode and the second electrode of the capacitive probe;
b) Determining a characteristic of the surface layer of the fuser element based on the capacitive measurement of step a);
wherein the capacitive probe further comprises a dielectric surface layer, wherein step a) comprises positioning the dielectric surface layer of the capacitive probe in contact with the surface layer of the fuser element in order to form a capacitor with the dielectric surface layer between both the first electrode and the second electrode of the capacitive probe and the surface layer of the fuser element.

The characteristic of the surface layer of the fuser element may be a thickness of the surface layer, may be a contamination on the surface layer (for example a paper dust or an oil smudge on top of the surface layer), may be a density of the surface layer, may be a composition of the surface layer and may be any other characteristic which can be determined by performing a capacitive measurement on the surface layer of the fuser element.

The first and the second electrode are operatively coupled to form a capacitor. The first electrode and the second electrode in operation are both arranged adjacent to and opposing the surface layer of the fuser element. The first electrode and second electrode are arranged substantially parallel to the surface layer. The first electrode and the second electrode may be temporarily arranged adjacent to and opposing the surface layer of the fuser element in the printing system, e.g. during a measurement operation of the printing system, and may be permanently arranged adjacent to and opposing the surface layer of the fuser element in the printing system.

The capacitive measurement on the surface layer of the fuser element is a simple and fast measurement, which can be carried out automatically in a printing system. Based on the capacitive measurement the characteristic of the surface layer of the fuser element can be monitored during life time of the fuser element.

The surface layer may comprise an elastomeric compound, may comprise a release fluid component, such as a silicon oil component, for releasing a marking material in a fusing pinch, may comprise a mechanical friction reduction component, such as a perfluoroalkylene polymer particle (e.g. Teflon), and may comprise an electro conductive component, such as a carbon particle.

The surface layer of the fuser element is an outer layer of the fuser element, which contacts the marking material and/or the recording medium during fusing of the marking material on the recording medium.

The capacitive probe comprises a first electrode and a second electrode, wherein the second electrode is arranged adjacent to the first electrode. The first electrode and the second electrode may be a plate electrode. The first electrode may be the same in area as the second electrode. The second electrode may also surround the first electrode. For example the first electrode may be a small diameter wire center electrode being enclosed by the second electrode, wherein the first electrode is coated with a thin electrically insulating coating.

The first electrode and second electrode may be arranged substantially parallel to each other. The first electrode and the second electrode may be arranged with respect to the surface layer in order to be equal in distance from the surface layer.

In the measurement step a) a capacitive measurement is performed by the capacitive probe on the surface layer of the fuser element. It is known to a person skilled in the art how to suitably select a distance between the first electrode and the second electrode and select a distance between both the first electrode and the second electrode in order to perform a capacitive measurement on the surface layer.

Furthermore it is known to a person skilled in the art how to measure a capacity of the capacitor formed by the first electrode and the second electrode. In particular it is known how to suitably select a potential for measuring a capacity of the capacitor.

In the determination step b) a characteristic of the surface layer of the fuser element is determined based on the capacitive measurement of step a). The characteristic may be determined based on a difference between the capacitive measurement of step a) and a predetermined capacitive measurement. For example a predetermined capacitive measurement of a starting characteristic of the surface layer of the fuser element before use in a printing system.

In an embodiment of the method, step b) comprises determining a thickness of the surface layer of the fuser element based on the capacitive measurement of step a). The thickness of the surface layer of the fuser element is a measure for the quality of fusing a marking material on a recording medium.

In an embodiment of the method, step b) comprises determining a contamination on the surface layer of the fuser element based on the capacitive measurement of step a). In fusing applications several contamination sources are known, such as paper residues, oil residues and glue residues. For example, in case the capacitive probe contacts the surface layer during step a), a paper dust particle on top of the surface layer of the fuser element will locally change the capacitive measurement of the capacitive probe at the position of the paper dust particle.

An occasional occurring contamination on the surface layer can be distinguished from a gradually changing surface layer thickness when regularly performing a capacitive measurement on the surface layer and monitoring the rate of the changing characteristic. In this way a position and a size of a paper dust contamination can be determined accurately and a maintenance process may be initiated in order to remove the paper dust contamination from the surface layer. Furthermore the success of a maintenance action may be determined by performing a capacitive measurement before and after the maintenance action.

In an embodiment of the method, step a) comprises positioning the first electrode and the second electrode spaced apart at a predetermined distance from the surface layer of the fuser element in order to form a capacitor gap with a gas between both the first electrode and the second electrode of the capacitive probe and the surface layer of the fuser element. The capacitor gap having the predetermined distance from the surface layer provides an accurate capacitive measurement while preventing mechanical wear of the surface layer during the measurement step.

In the method according to the present invention, the capacitive probe further comprises a dielectric surface layer, wherein step a) comprises positioning the dielectric surface layer of the capacitive probe in contact with the surface layer of the fuser element in order to form a capacitor with the dielectric surface layer between both the first electrode and the second electrode of the capacitive probe and the surface layer of the fuser element. The dielectric surface layer provides an accurate capacitive measurement by providing a controlled distance and a controlled dielectric layer between both the first and the second electrode and the surface layer.

In an embodiment said dielectric surface layer is a semiconducting layer. According to this embodiment of the invention, said semiconducting layer may be formed, for example, by a known sputtering process, consisting of an oxide or nitride, such as silicon oxide, aluminum oxide, silicon nitride and zinc oxide, the oxygen or nitrogen proportion of which in the molecular lattice is suitably selected for providing a semiconducting property.

Said semiconducting layer improves the determining step of a characteristic of the surface layer of the fuser element. For example, in case the surface layer of the fuser element is a (semi)conducting surface layer, said semiconducting layer of the capacitive probe enhances the determination of the thickness of the surface layer of the fuser element.

Furthermore in case a contamination is present on top of the surface layer of the fuser element, said contamination may be determined more accurate when using a semiconducting layer as the dielectric surface layer of the capacitive probe.

For example for a silicon oxide ($SiO_x$) semiconducting layer it is known to select the oxygen proportion x (i.e. is the ratio O/Si) lower than 1.5 in order to achieve an electrical conductivity higher than $10^{-12}$ $\Omega^{-1}$ $cm^{-1}$ at room temperature.

In a particular embodiment said dielectric surface layer comprises silicon oxide ($SiO_x$), wherein x is on the average in the range of 0.4-1.4. Said embodiment provides an electrical conductivity in the range of approximately $10^{-6}$ $\Omega^{-1}$ $cm^{-1}$ to $10^{-10}$ $\Omega^{-1}$ $cm^{-1}$ at room temperature.

In an embodiment said dielectric surface layer comprises a layer of silicon oxide comprising a bottom portion of the dielectric surface layer, which is arranged in electrical connection to the first electrode and the second electrode, consisting of $SiO_x$ where x is approximately or on the average of about 0.40-0.65, and a top portion of the dielectric surface layer, which is arranged adjacent to an outer surface of the dielectric surface layer, consisting of $SiO_x$, where x is approximately or on the average of about 1.2-1.6. Said dielectric surface layer further improves the accuracy of the capacitive probe.

In an embodiment of the method, the fuser element is rotatably arranged around an axis and wherein step a) comprises performing a plurality of capacitive measurements while rotating the fuser element around the axis. By rotating the fuser element around the axis easily a plurality of capacitive measurements can be performed on the surface layer while maintaining the capacitive probe at the same position with respect to the fuser element.

In an embodiment of the method, the capacitive probe comprises at least three electrodes, wherein the at least three electrodes are in operation distributed along an axial direction of the fuser element, and wherein step a) comprises performing a plurality of capacitive measurements along the axial direction of the fuser element, wherein each of the plurality of capacitive measurement is being performed by two adjacent electrodes of the at least three electrodes. By suitably selecting two adjacent electrodes of the at least three electrodes easily a plurality of capacitive measurements can be performed on the surface layer along the axial direction of the fuser element.

In an embodiment of the method, step a) comprises step a1) moving the capacitive probe and the fuser element relative to each other in an axial direction of the fuser element and step a2) performing a plurality of capacitive measurements along the axial direction of the fuser element. In a particular embodiment the capacitive probe is moved in the axial direction along the fuser element. A plurality of capacitive measurements along the axial direction of the fuser element can easily be obtained by moving the capacitive probe and the fuser element relative to each other in the axial direction. The capacitive probe may be designed small and light-weighted, due to comprising merely the first electrode and the second electrode, suitable for fast and accurate movement of the capacitive probe.

In an embodiment of the method, step a) comprises changing the potential of the first electrode by a predetermined voltage and measuring the amount of charge flowing to or from the second electrode in response to the change in potential of the first electrode. Embodiment provides a simple and accurate capacitive measurement.

The invention relates further to a printing system for providing a marking material on a recording medium comprising:
- a fuser element comprising a surface layer for fusing the marking material on the recording medium;
- a capacitive probe, the capacitive probe comprising a first electrode and a second electrode, the second electrode being arranged adjacent to the first electrode in order to form a capacitor, the first electrode and the second electrode in operation both being arranged adjacent to and opposing the surface layer of the fuser element; and
- a capacitance measuring circuit for performing a capacitive measurement on the surface layer of the fuser element, the capacitance measuring circuit being operatively coupled to the first electrode and the second electrode of the capacitive probe, wherein the capacitive probe comprises a dielectric surface layer, the dielectric surface layer in operative condition being engaged against the surface layer of the fuser element.

The printing system may be a toner printing system and may be an inkjet printing system. The marking material may be toner, may be ink, and may be any other material suitable for providing an image on a recording medium.

The fuser element may be a fuser belt and may be a fuser roller.

The capacitive measurement circuit is operatively coupled to the first electrode and the second electrode of the capacitive probe in order to perform a capacitive measurement. The capacitive probe is in operation arranged with respect to the surface layer of the fuser element for performing a capacitive measurement on the surface layer of the fuser element.

In the printing system, the capacitive probe comprises a dielectric surface layer, the dielectric surface layer in operative condition being engaged against the surface layer of the fuser element. The dielectric surface layer provides an accurate capacitive measurement by providing a controlled distance and a controlled dielectric layer between both the first and the second electrode and the surface layer.

In an embodiment of the printing system, the capacitive probe comprises at least three electrodes, the at least three electrodes in operative condition being distributed along an axial direction of the fuser element. By suitably selecting two adjacent electrodes of the at least three electrodes easily a plurality of capacitive measurements can be performed on the surface layer along the axial direction of the fuser element.

In a particular embodiment of the printing system, the printing system further comprises an image forming element, wherein the capacitive probe is configured for in printing operation image-wise developing the marking material on a surface of the image forming element by providing a potential on each of the at least three electrodes of the capacitive probe. In a particular embodiment the image forming element and the capacitive probe are the same, wherein the at least three electrodes are arranged inside the surface of the image forming element. The image forming element is arranged adjacent to the fuser element in printing operation for transferring the image to the fuser element. The image forming element can be used both in printing operation for image-wise developing the marking material on the surface of the image forming element and transferring the image to the surface layer of the fuser element and in measurement operation for performing a capacitive measurement on the surface layer of the fuser element.

In an embodiment of the printing system, the printing system further comprises a capacitive probe scanning device, which is configured for in operation moving the capacitive probe along an axial direction of the fuser element. The capacitive probe scanning device may comprise a linear driving motor, may comprise a belt, may comprise a reference pattern and may comprise a distance unit for maintaining the capacitive probe at a distance from the surface layer of the fuser element. A plurality of capacitive measurements along the axial direction of the fuser element can easily be obtained by moving the capacitive probe and the fuser element relative to each other in the axial direction.

In an embodiment of the printing system, the fuser element is an intermediate image transfer element configured for, in operation of the printing system, transferring the marking material to the recording medium. The intermediate image transfer element may be a belt and may be a roller. The intermediate image transfer element may in a first transfer position (e.g. a transfer pinch) receive an image consisting of the marking material and may in a second transfer position (e.g. a transfuse pinch) transfer the image consisting of the marking material to the recording medium while fusing the marking material on the recording medium.

In an embodiment of the printing system, the surface layer of the fuser element comprises an elastomeric material. The elastomeric material may be suitably selected for providing a uniform pressure in a fusing pinch.

In an embodiment of the printing system, the surface layer of the fuser element comprises an electro conductive component.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

BRIEF DESCRIPTION OF THE DRAWINGS

Hereinafter, the present invention is further elucidated with reference to the appended drawings showing non-limiting embodiments and wherein.

DETAILED DESCRIPTION OF EMBODIMENTS

Figure 1:
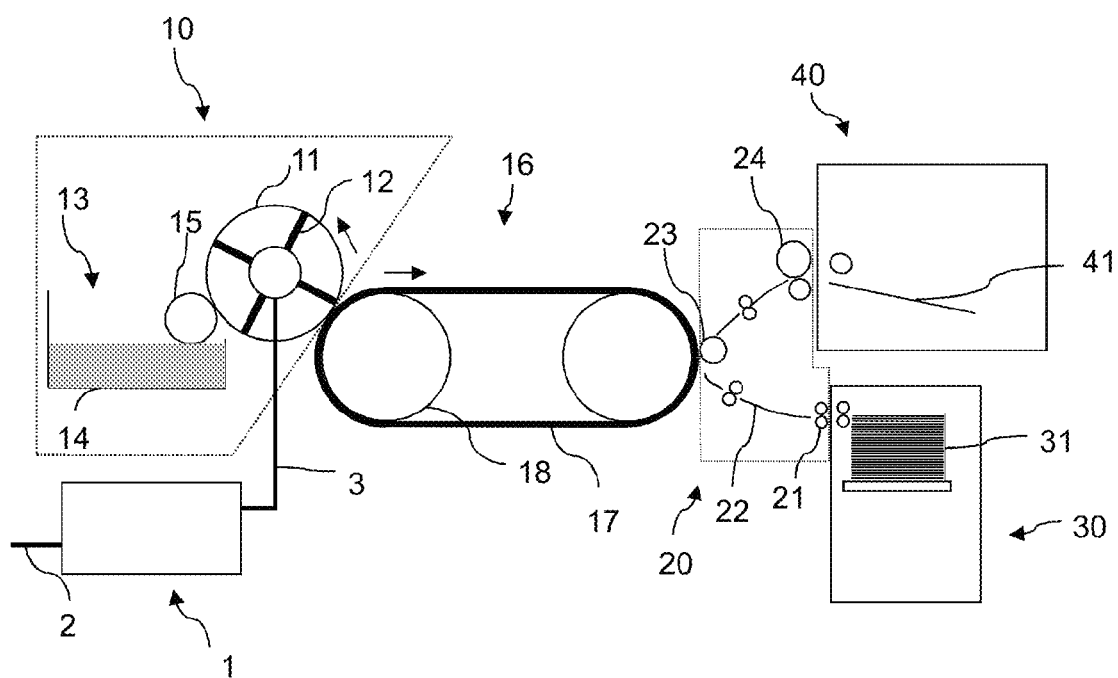
FIG. 1 shows a schematic view of a print engine in which a method according to the invention may be used.

The present invention will now be described with reference to the accompanying drawings, wherein the same reference numerals have been used to identify the same or similar elements throughout the several views.

FIG. 1 shows a print engine for printing images. The print engine comprises a converter 1 to convert image data into a print signal, an image forming module 10 to apply marking material corresponding to the print signal, the marking material being brought in contact with the image forming element 11 by a developing unit 13, an intermediate member 16 for transferring the marking material to the image fixing module 20, an image receiving member input station 30 for bringing in an image receiving member, usually sheets media, and a delivery station 40 for receiving the finished output product. In this embodiment the marking material is conventionally toner, which comprises a resin that is softened by heat.

The image data are supplied to the print engine through a data connection 2. This may be any suitable data connection, depending among other things on the required bandwidth. The digital image converter 1 comprises electronic circuits including programmable logic to convert an image line into a print signal that is suitable to be applied to the image forming module 10 through a data connection 3. In FIG. 1 the image forming module 10 comprises a rotatable, substantially cylindrically shaped image forming element 11 having an electronic device 12 in the inside to apply a voltage on conductive tracks under a dielectric layer on an outer surface of the image forming element. This voltage induces a local electric field outside the image forming element that attracts toner particles from developing roller 15 that receives the toner particles from a toner supply unit 14. In this way an image of toner particles is formed on the surface of the image forming element 11.

Alternatively the image forming element 11 may comprise a roller with a photoconductive layer on the outside surface of the roller. In such embodiment the surface of the photoconductive layer is charged by e.g. a corona and the print signals are applied to an imaging unit outside the roller. The imaging unit may comprise a LED-bar, or a laser scan module, that locally illuminates the layer conform the image to be printed. The photoconductivity of the layer results in a locally discharged surface. The parts of the photoconductive layer that remain charged may be used to attract toner from a toner roller like developing roller 15 by creating an electric field between these charged parts and the toner roller. In an embodiment an electric field between the charged parts and the toner roller may be provided by connecting the toner roller to a ground voltage. The toner may comprise electrically conductive particles having a specified color or a mixture of isolating colored particles and carrier particles that charge the isolating particles, making them sensitive to an electric field between the developing roller and the image forming element. Instead of carrier particles the developing roller may also be supplemented by a contact roller that charges the toner particles. Therefore there are various ways to obtain an image of toner particles on the surface of the image forming element. In the process of forming the image the element rotates in the direction indicated by the arrow in FIG. 1. It is further noted that in another embodiment, an imaging forming element is formed by arranging a belt with a photoconductive layer on several rollers.

The intermediate member 16 comprises a belt 17 and two guiding rollers 18, but more rollers are also possible. The belt 17 rotates in congruence with the image forming element 11 and receives the toner image in a nip where the image forming element 11 and the belt 17 are in contact. The transfer of toner may take place by the influence of mechanical forces that are induced when the top layer of the belt comprises an elastic, adhesive material, such as rubber, or by the influence of electric forces that originate from a voltage difference between the image forming element and the belt. The intermediate member 16 may further comprise a heating unit, which is not shown in FIG. 1, to control the temperature of the belt. Although only one image forming element is shown in FIG. 1, the intermediate member may be configured to have several image forming elements around it, each for a different process color of toner particles that are collected on the belt. In this way a full color image may be formed, e.g. by the process colors cyan, magenta, yellow and black. The intermediate member may also be configured as a drum with an outer layer that is suitable to collect the various color particles.

The image fixing module 20 is able to transport an image receiving member, such as a sheet of paper, by transport rollers 21 and guiding means 22 to a pressure roller 23 that brings the image receiving member into contact with the belt 17 of the intermediate member 16. The image receiving member is supplied by an image receiving member input station 30 comprising a pile of sheets 31. By applying heat and pressure the toner is brought onto the image receiving member, which is transported further towards the post processing unit 40. The image fixing module may comprise a path for turning the image receiving member to be able to print another side. The fuser rollers 24 raise the temperature of the image receiving member to further fix the printed image on the image receiving member and to enhance the printed image quality. When the temperature of the pressure roller 23 is sufficiently high, no fuser rollers are necessary.

The post processing unit 40 is shown as a support tray 41, on which different sheets may be stacked, but may also comprise a stapler, a hole puncher etc. for performing a post processing step. The various modules are controlled by a control unit to have their actions coordinated.

Figure 2A:
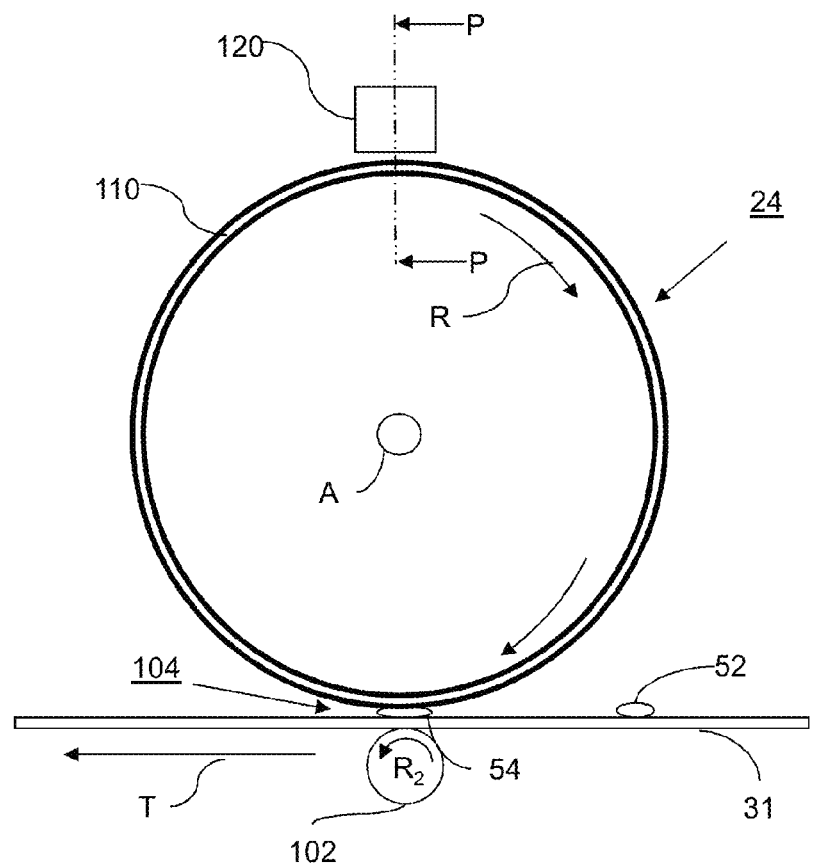
FIG. 2A shows a fuser roller and a capacitive probe according to the invention.

FIG. 2A shows a fuser roller and a capacitive probe according to the invention. The fuser roller 24 is configured for fusing a marking material 52 on a recording medium 31 in a fusing nip 104. The fuse roller 24 comprises a surface layer 110, which surface layer 110 comprises an elastomeric compound. The fuse nip 104 is formed by the fuser roller 24 and a pressure roller 102. The pressure roller 102 brings the recording medium 31 into contact with the fuser roller 24. The recording medium 31 is transported in a transport direction indicated by arrow T through the fuse nip 104. On the recording medium 31 a marking material 52 is provided in an imaging process. The imaging process may for example be a toner imaging process, may be an inkjet imaging process and may be any other process for providing an image on a recording medium. The fuser roller 24 is rotated around axis A in a direction as indicated by arrow R. The pressure roller 102 is freely rotatably arranged. In case the recording medium 31 passes through the fuse nip 104, the pressure roller 102 rotates in a direction indicated by arrow R2. The marking material 54 is fixed on the recording medium 31 in the fuse nip 104.

A capacitive probe 120 is arranged adjacent to the surface layer 110 of the fuser roller 24. The capacitive probe 120 is operatively coupled to a capacitive measurement circuit 130 for measuring a capacity by the capacitive probe 120 and determining a characteristic of the surface layer 110.

Figure 2B:
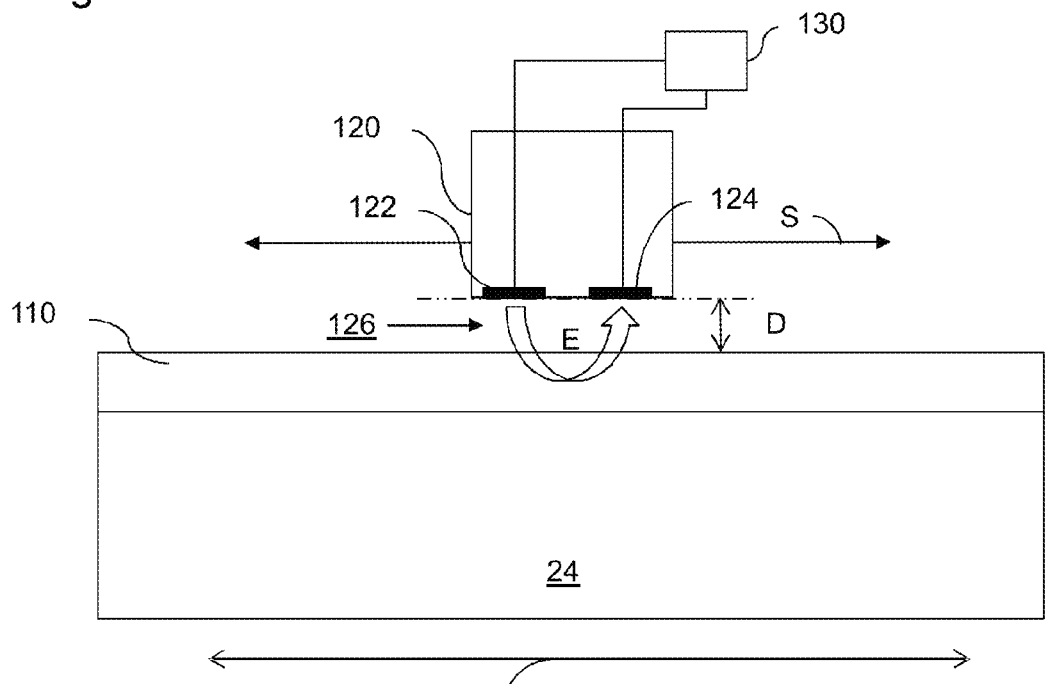
FIG. 2B shows a cross section view along the line P-P in FIG. 2A of the capacitive probe according to a first embodiment of the invention.

FIG. 2B shows a cross section view along the line P-P in FIG. 2A of the capacitive probe according to a first embodiment of the invention. In FIG. 2B the capacitive probe 120 comprises a first electrode 122 and a second electrode 124. Both first electrode 122 and second electrode 124 are operatively coupled to the capacitive measurement circuit 130. The second electrode 124 is arranged adjacent to the first electrode 122 thereby forming a capacitor. Both the first electrode 122 and the second electrode 124 are plate electrodes, and both electrodes 122, 124 are arranged adjacent to and opposing the surface layer 110 of the fuser roller 24. Both first electrode 122 and second electrode 124 are arranged at a distance D from the surface layer 110 of the fuser roller 24, thereby forming a gap 126, which comprises air, between both first electrode 122 and second electrode 124 and the surface layer 110.

During a capacitive measurement cycle the potential of the first electrode 122 is changed by a predetermined voltage. An electric field E is generated towards the second electrode 124, schematically indicated by arrow E, which passes through the gap 126 and passes through the surface layer 110. At the same time an amount of charge flowing to or from the second electrode 124 in response to the change in potential of the first electrode 122 is measured. The predetermined voltage of the first electrode 122 and the distance D are suitably selected in order to measure a permittivity of the surface layer 110. Based on the capacitive measurement a thickness of the surface layer 110 is determined by comparing the result of the capacitive measurement with a predetermined capacitive constant of the surface layer 110 in a known state (e.g. initial state), in which state the thickness is known.

The capacitive probe 120 is movably arranged in a direction parallel to the surface layer 110 and parallel to the axial direction A, as is indicated by arrow S. The capacitive probe 120 in a next step may be moved in the axial direction A by a capacitive scanning device (not shown), which comprises a linear motor and a linear encoder configured for accurately positioning the capacitive probe 120 along the axial direction A. A plurality of capacitive measurements is performed at a plurality of positions of the surface layer along the axial direction A. The capacitive measurement circuit 130 determines for each capacitive measurement a thickness of the surface layer 110 at the respective position. In this way a variation of the thickness of the surface layer 110 in the axial direction A is determined.

Furthermore in another step the fuser element can be rotated in the direction R (as shown in FIG. 2A), while a distance D of the capacitive probe 120 from the surface layer 110 is maintained. During rotation of the fuser roller 24 a plurality of capacitive measurements is performed on a plurality of parts of the surface layer 110 along a radial direction. In this way a variation in thickness of the surface layer 110 in the radial direction is determined.

Figure 2C:
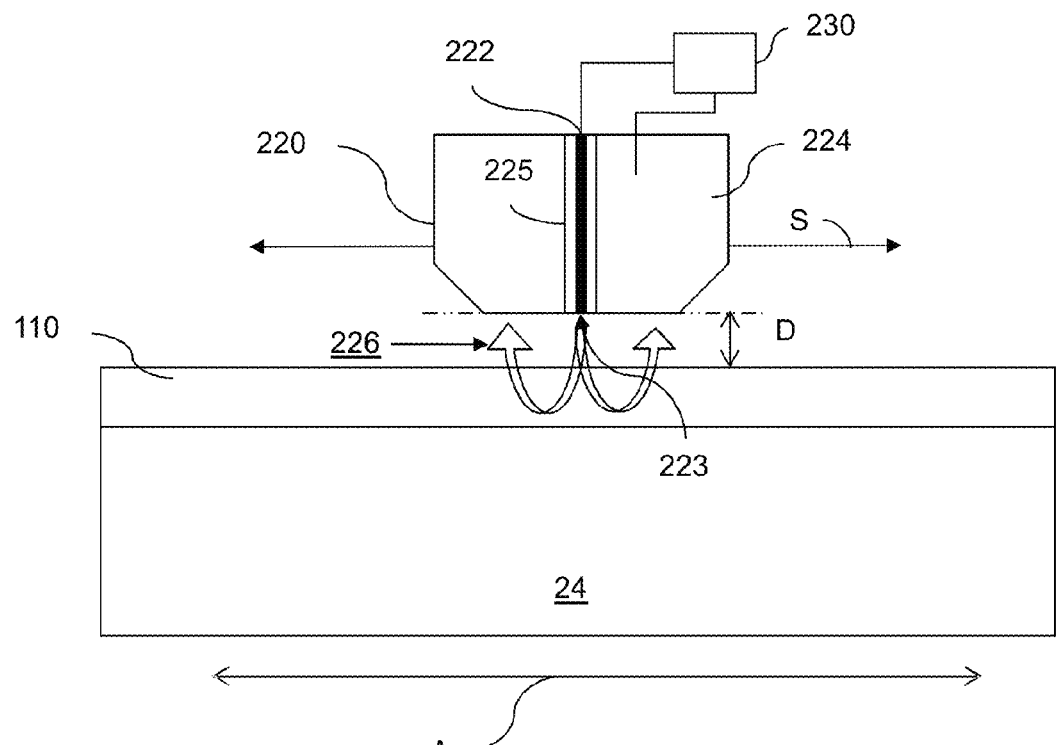
FIG. 2C shows a cross section view along the line P-P in FIG. 2A of the capacitive probe according to a second embodiment of the invention.

FIG. 2C shows a cross section view along the line P-P in FIG. 2A of the capacitive probe according to a second embodiment of the invention. The capacitive probe 220 comprises a first electrode 222 and a second electrode 224. The second electrode 224 surrounds the first electrode 222. The first electrode 222 comprises an electric insulating coating 225 in order to electrically decouple the first electrode 222 from the second electrode 224. The first electrode 222 further comprises an uncovered end 223. Both electrodes 222, 224 are operatively coupled to the capacitive measurement circuit 230. The second electrode 224 is arranged adjacent to the end 223 of the first electrode thereby forming a capacitor. Both the end 223 of the first electrode and the second electrode 224 are arranged adjacent to and opposing the surface layer 110 of the fuser roller 24 at a distance D from the surface layer 110 of the fuser roller 24, thereby forming a gap 226, which contains air, between both first electrode 222 and second electrode 224 and the surface layer 110.

During a capacitive measurement cycle the potential of the first electrode 222 is changed by a predetermined voltage. An electric field E is generated from the first electrode 222 to the surrounding second electrode 224, schematically indicated by two arrows E, which passes through the gap 226 and through the surface layer 110. At the same time an amount of charge flowing to or from the second electrode 224 in response to the change in potential of the first electrode 222 is measured. The predetermined voltage of the first electrode 222 and the distance D are suitably selected in order to measure a permittivity of the surface layer 110. Based on the capacitive measurement a thickness of the surface layer 110 is determined by comparing the result of the capacitive measurement with a predetermined capacitive constant of the surface layer 110 in a known state (e.g. initial state), in which state the thickness is known.

The capacitive probe 220 is movably arranged in a direction parallel to the surface layer 110 and parallel to the axial direction A, as is indicated by arrow S. A plurality of capacitive measurements is performed in a next step at a plurality of positions of the surface layer along the axial direction. The capacitive measurement circuit 230 determines for each capacitive measurement a thickness of the surface layer 110. In this way a variation of the thickness of the surface layer 110 in the axial direction is determined.

Furthermore in another step the fuser roller 24 is rotated in the direction R (as shown in FIG. 2A), while a position of the capacitive probe 220 adjacent to the surface layer 110 and the distance D is maintained. During rotation of the fuser roller 24 a plurality of capacitive measurements is performed. In this way a variation in thickness of the surface layer 110 in a radial direction can be determined.

Figure 2D:
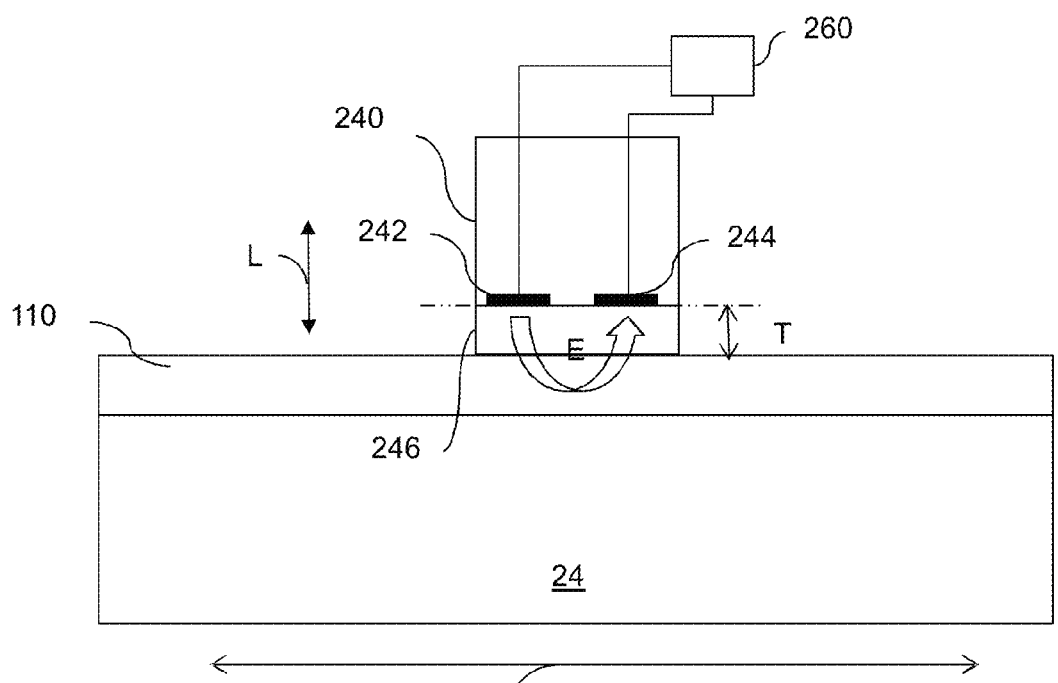
FIG. 2D shows a cross section view along the line P-P in FIG. 2A of the capacitive probe according to a third embodiment of the invention.

FIG. 2D shows a cross section view along the line P-P in FIG. 2A of the capacitive probe according to a third embodiment of the invention. The capacitive probe 240 comprises a first electrode 242 and a second electrode 244. Both first electrode 242 and second electrode 244 are operatively coupled to the capacitive measurement circuit 260. The second electrode 244 is arranged adjacent to the first electrode 242 thereby forming a capacitor. Both the first electrode 242 and the second electrode 244 are plate electrodes, which are both arranged adjacent to and opposing the surface layer 110 of the fuser roller 24. The capacitive probe further comprises a dielectric surface layer 246, which is arranged in between the first and second electrode 242, 244 and the surface layer 110 of the fuser roller 24. The dielectric surface layer has a thickness T. The dielectric surface layer 246 of the capacitive probe is arranged in contact with the surface layer 110.

The capacitive probe 240 is movably arranged with respect to the fuser roller 24, as indicated by arrow L. The capacitive probe 240 may be positioned in contact with the surface layer 110 and may be lifted from the surface layer 110. The capacitive probe 110 may also be forced against the surface layer 110 at a suitably selected force in order to enhance the contact between the capacitive probe 240 and the surface layer 110. Based on the capacitive measurement a thickness of the surface layer 110 is determined by comparing the result of the capacitive measurement with a predetermined capacitive constant of the surface layer 110 in a known state (e.g. initial state), in which state the thickness is known.

During a capacitive measurement cycle the potential of the first electrode 242 is changed by a predetermined voltage. An electric field E is generated towards the second electrode 244, indicated by arrow E, which passes through the dielectric surface layer 246 and through the surface layer 110. At the same time an amount of charge flowing to or from the second electrode in response to the change in potential of the first electrode is measured. The thickness T and a dielectric property of the dielectric surface layer 246, and the predetermined voltage of the first electrode 222 are suitably selected in order to measure a permittivity of the surface layer 110.

In an embodiment of the present invention said dielectric surface layer is a semiconducting layer. According to this embodiment, said semiconducting layer may be formed, for example, by a known sputtering process, consisting of an oxide or nitride, such as silicon oxide, aluminum oxide, silicon nitride and zinc oxide, the oxygen or nitrogen proportion of which in the molecular lattice is suitably selected for providing a semiconducting property.

Said semiconducting layer improves the determining step of a characteristic of the surface layer of the fuser element. For example, in case the surface layer of the fuser element is a (semi)conducting surface layer, said semiconducting layer of the capacitive probe enhances the determination of the thickness of the surface layer of the fuser element.

Furthermore in case a contamination is present on top of the surface layer of the fuser element, said contamination may be determined more accurate when using a semiconducting layer as the dielectric surface layer of the capacitive probe.

Examples of Semiconducting Dielectric Surface Layers

For example for a silicon oxide ($SiO_x$) semiconducting layer it is known to select the oxygen proportion x (i.e. is the ratio O/Si) lower than 1.5 in order to achieve an electrical conductivity higher than $10^{-12} \, \Omega^{-1} \, cm^{-1}$ at room temperature.

In a particular example said dielectric surface layer 246 comprises silicon oxide ($SiO_x$), wherein x is on the average in the range of 0.4-1.4. Said embodiment provides an electrical conductivity in the range of approximately $10^{-6} \, \Omega^{-1} \, cm^{-1}$ to $10^{-10} \, \Omega^{-1} \, cm^{-1}$ at room temperature.

In a particular example said dielectric surface layer 246 comprises a layer of silicon oxide comprising a bottom portion of the dielectric surface layer, which is arranged in electrical connection to the first electrode and the second electrode, consisting of $SiO_x$ where x is approximately or on the average of about 0.40-0.65, and a top portion of the dielectric surface layer, which is arranged adjacent to an outer surface of the dielectric surface layer, consisting of $SiO_x$, where x is approximately or on the average of about 1.2-1.6. Said outer surface of the dielectric surface layer may be arranged into contact with a surface layer of a fuser element. Said dielectric surface layer further improves the accuracy of the capacitive probe.

In an example for providing a dielectric surface layer 246 on top of the first electrode 242 and second electrode 244 a silicon oxide layer may be applied by a known sputter technique in a vacuum chamber, e.g. of the Balzers LLS 801 type, silicon being sputtered from a silicon target with the introduction of argon and oxygen into the chamber, and in the first phase of the sputtering process the supply of oxygen is so set that $SiO_x$, wherein $x=\pm 0.5$, is applied and in the second phase of the process the oxygen supply is increased so that $SiO_x$, wherein $x=\pm 1.5$, is formed. The quantity of oxygen to be introduced to achieve the required $SiO_x$ composition can be determined by experiment by making a number of samples by varying the quantity of oxygen introduced and determining the silicon/oxygen ratio of the $SiO_x$ layer on the various samples by EDX analysis (Energy Dispersive X-ray Analysis). Before the samples are analyzed the analyzer (Tracor TN 5500 of Tracor Europe, Amersfoort, Netherlands) is calibrated with a reference standard of at least 99.9% $SiO_2$. A layer of carbon some tens of nanometers thick is vapor coated over the $SiO_x$ layer of the samples to be measured, as is known with EDX analysis. This vapor coated carbon layer is also present on the reference standard.

As such a dielectric surface layer 246 is formed having a thickness of about 0.8 μm-1.5 μm, having a bottom portion in a thickness of about 0.2 μm-0.75 μm consisting of $SiO_x$ where $x=\pm 0.5$ and a top portion consists in a thickness of about 0.2 μm-0.75 μm consisting of $SiO_x$ where $x=\pm 1.5$.

Figure 3A:
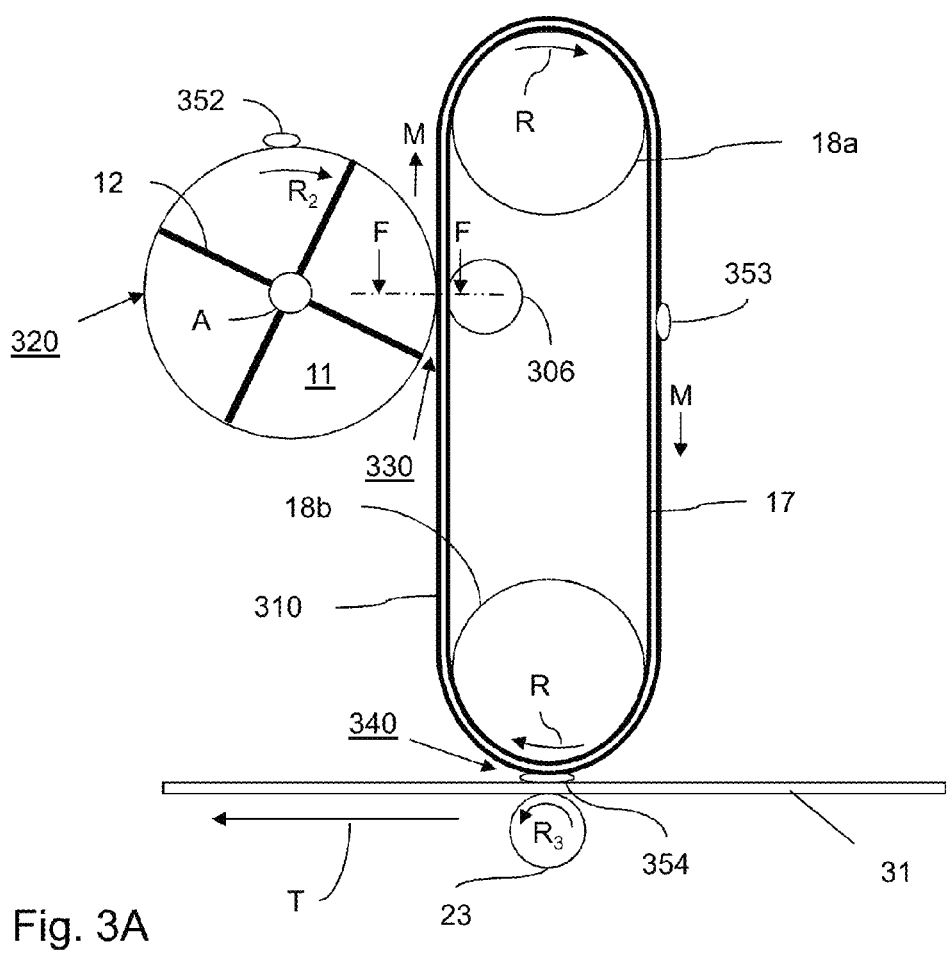
FIG. 3A shows a fuser belt and an imaging forming element used as capacitive probe according to the invention.

FIG. 3A shows a fuser belt and an imaging forming element used as capacitive probe according to the invention. The fuser belt 17 comprises a surface layer 310. The fuser belt 17 is driven by a first guiding roller 18a at a first end and a second guiding roller 18b at a second end. The fuser belt 17 forms together with the first guiding roller 18a and a pressure roller 23 a transfuse nip 340. The pressure roller 23 brings the recording medium 31 into contact with the fuser belt 17. The pressure roller 23 is rotatably arranged as indicated by arrow $R_3$. A recording medium 31 is transported through the transfuse nip 340 in a direction T.

A marking material 352 is developed on the image forming element 11, which is an image drum. The imaging drum 11 comprises a plurality of imaging electrodes 320, which are distributed in an axial direction (indicated by axis A) of the imaging drum 11. The plurality of imaging electrodes 320 are provided under a dielectric surface layer, each of the plurality of imaging electrodes 320 extending parallel to each other in a radial direction of the image forming element 11. The imaging drum 11 and a direct imaging process are further disclosed in EP 191521. The imaging drum 11 forms together with the fuser belt 17 and an pressure roller 306 an image transfer nip 330 for transferring the marking material 352 (or transferring an image constituted by the marking material 352) from the imaging drum 11 to the fuser belt 17. The imaging drum 11 is rotatably arranged in a direction as indicated by arrow $R_2$. An image comprising a marking material 353, which has been transferred from the imaging drum 11 to the surface layer 310 of the fuser belt, is transported by the fuser belt 17 to the transfuse nip 340 as indicated by arrow M. In the transfuse nip 340 a marking material 354 is transferred, and optionally fused, to the recording medium 31.

Figure 3B:
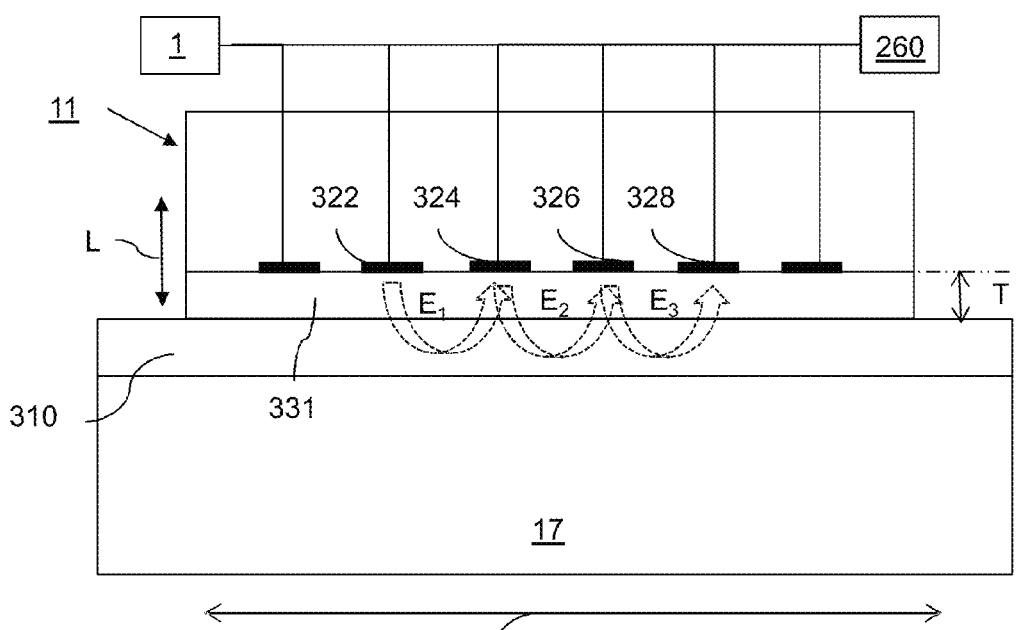
FIG. 3B shows a cross section along the line F-F in FIG. 3A of the transfer nip in an axial direction of the image drum of an embodiment of the invention.

FIG. 3B shows a cross section along the line F-F in FIG. 3A of the transfer nip in an axial direction of the image drum of an embodiment of the invention. The imaging drum 11 is in measurement operation used as a capacitive probe. The imaging drum 11 comprises a first electrode 322, a second electrode 324, a third electrode 326, a fourth electrode 328, etc, which are distributed along the axial direction A of the imaging drum 11. The electrodes 322-328 shown are a part of the plurality of imaging electrodes 320 (shown in FIG. 3A), which are used in printing operation of the image drum 11 to develop an image of marking material 352 on the imaging drum 11. The electrodes 332-328 are arranged adjacent to and opposing the surface layer 310 of the fuse belt 17. The imaging drum 11 further comprises a dielectric surface layer 331, which is arranged in contact with the surface layer 310 of the fuser belt 17. The dielectric surface layer 331 has a thickness T. The dielectric surface layer 331 may be a semiconducting layer, for example a $SiO_x$ layer according to one of the examples of semiconducting dielectric surface layers described in relation to FIG. 2D. During a printing mode the electrodes 322-328 are operatively coupled to the digital image converter 1 for providing a potential to each of the plurality of imaging electrodes 320. In the printing mode a marking material is transferred in the transfer nip 330 from the imaging drum 11 to the fuser belt 17 (printing mode is not shown).

In FIG. 3B a first phase, a second phase and a third phase of a capacitive measurement according to the embodiment is shown. In the measurement mode the electrodes 322-328 are operatively coupled to a capacitive measurement circuit 260. The capacitive probe 11 is movably arranged with respect to the fuser belt 17, as indicated by arrow L. In the measurement mode the capacitive probe 310 is forced against the surface layer 310 at a suitably selected force in order to enhance the contact between the capacitive probe 11 and the surface layer 310.

During a first capacitive measurement cycle the potential of the first electrode 322 is changed by a predetermined voltage. An electric field E is generated towards the second electrode 324, indicated by arrow $E_1$, which passes through the dielectric surface layer 331 and through the surface layer 310. At the same time an amount of charge flowing to or from the second electrode in response to the change in potential of the first electrode is measured.

During a second capacitive measurement cycle the potential of the second electrode 324 is changed by a predetermined voltage. An electric field E is generated towards the third electrode 326, indicated by arrow $E_2$, which passes through the dielectric surface layer 331 and through the surface layer 310. At the same time an amount of charge flowing to or from the third electrode 326 in response to the change in potential of the second electrode 324 is measured.

During a third capacitive measurement cycle the potential of the third electrode 326 is changed by a predetermined voltage. An electric field E is generated towards the fourth electrode 328, indicated by arrow $E_3$, which passes through the dielectric surface layer 331 and through the surface layer 310. At the same time an amount of charge flowing to or from the fourth electrode 328 in response to the change in potential of the third electrode 328 is measured.

A person skilled in the art may contemplate that like-wise each two adjacent electrodes of the plurality of electrodes 320 may be used in a capacitive measurement in order to measure a plurality of portions of the surface layer 310 in the axial direction A.

Figure 3C:
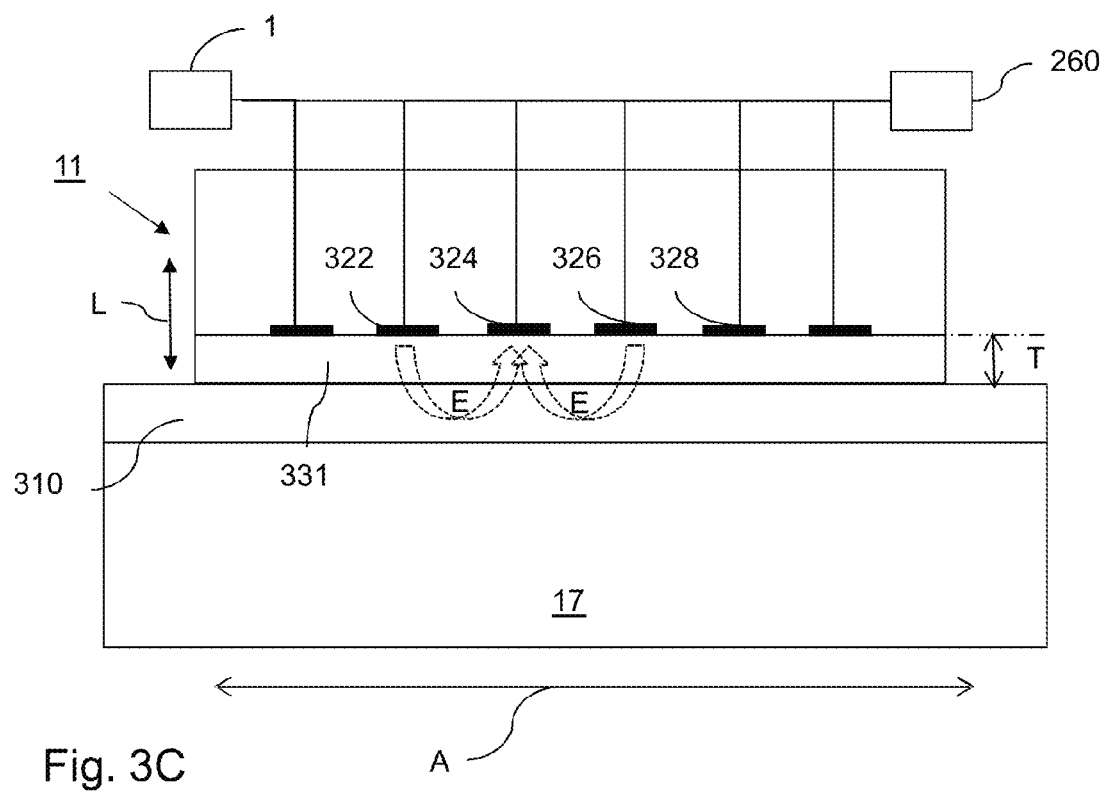
FIG. 3C shows a cross section along the line F-F in FIG. 3A of the transfer nip in an axial direction of the image drum of an alternative embodiment of the invention.

FIG. 3C shows a cross section along the line F-F in FIG. 3A of the transfer nip in an axial direction of the image drum of an alternative embodiment of the invention. In FIG. 3C a capacitive measurement is shown. During the capacitive measurement cycle the potential of the first electrode 322 and the third electrode 326 is changed by a predetermined voltage. An electric field E is generated from both the first electrode 322 and third electrode 326 towards the second electrode 324, schematically indicated by arrow E, which passes through the dielectric surface layer 331 and through the surface layer 310. At the same time an amount of charge flowing to or from the second electrode 324 in response to the change in potential of the electrodes 322, 326 is measured.

Furthermore in another step of the embodiments shown in FIG. 3B and FIG. 3C the imaging drum 11 is rotated in the direction $R_2$. At the same time, the fuser belt 17 is in rolling contact with the imaging drum 11 and is transported through the transfer nip 330 by rotating the guiding rollers 18a, 18b in the direction R. A direct contact between the dielectric surface layer 331 of the capacitive probe and the surface layer 110 is maintained. During rotation of the capacitive probe 11 and transport of the fuser belt 17 through the transfer nip 330 a plurality of capacitive measurements is performed by two adjacent electrodes of the capacitive probe on a plurality of portions of the surface layer 310 in a transport direction M. In this way a variation in thickness of the surface layer 310 in the transport direction M along the fuser belt 17 is determined.

Figure 3D:
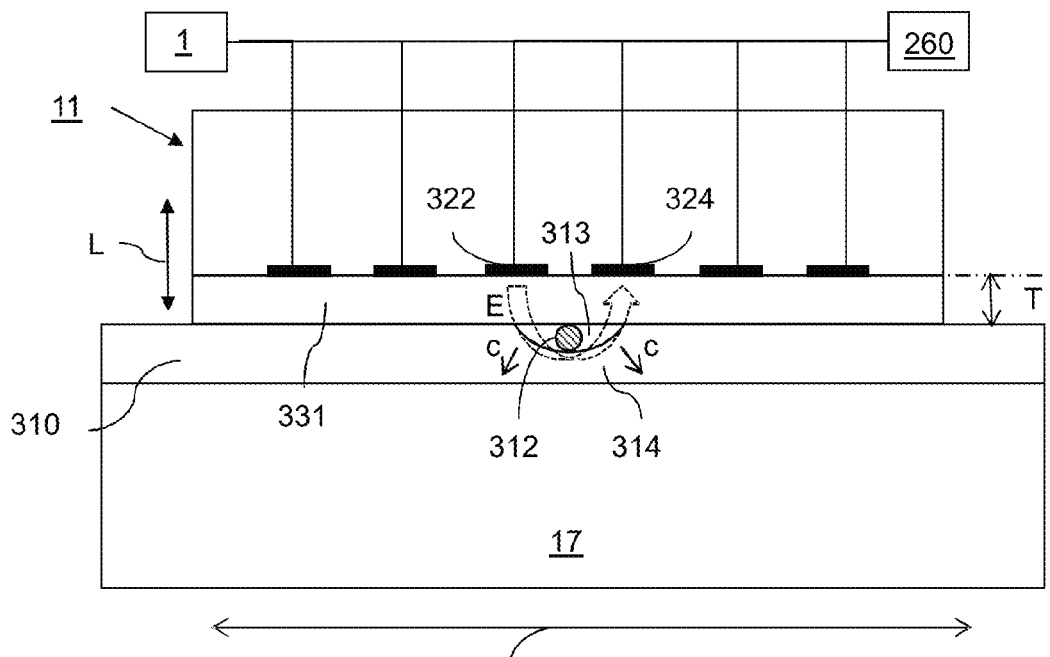
FIG. 3D shows a cross section along the line F-F in FIG. 3A of the transfer nip in an axial direction of the image drum of an embodiment of the invention for determining a contamination on the surface layer.

FIG. 3D shows a cross section along the line F-F in FIG. 3A of the transfer nip in an axial direction of the image drum of an embodiment of the invention for determining a contamination on the surface layer. In FIG. 3d a capacitive measurement is shown. A paper dust particle 312 is present between the dielectric surface layer 331 of the capacitive probe and the surface layer 310 of the fuser element. Due to the paper dust particle 312 a part 314 of the surface layer is compressed towards the fuser element as indicated by arrow c. Thereby a gap 313 is introduced between the dielectric surface layer 331 of the capacitive probe and the surface layer 310 of the fuser element.

During the capacitive measurement cycle the potential of the first electrode 322 and the second electrode 324 is changed by a predetermined voltage. An electric field E is generated from the first electrode 322 towards the second electrode 324, schematically indicated by arrow E, which passes through the gap 313 between dielectric surface layer 331 and the surface layer 310. At the same time an amount of charge flowing to or from the second electrode 324 in response to the change in potential of the first electrode 322 is measured.

The result of the capacitive measurement is different from a situation when no paper dust particle is present as the gap 313 and the paper dust particle 314 have a substantially different dielectric property than the surface layer 310 of the fuser element. Based on the capacitive measurement the position and size of the paper dust contamination is determined. A maintenance action may be initiated to remove the paper dust contamination.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, features presented and described in separate dependent claims may be applied in combination and any advantageous combination of such claims is herewith disclosed.

Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for determining a characteristic of a surface layer of a fuser element for fusing a marking material on a recording medium in a printing system, the printing system comprising a capacitive probe comprising a first electrode and a second electrode, the second electrode being arranged adjacent to the first electrode in order to form a capacitor, the first electrode and the second electrode in operation both being arranged adjacent to and opposing the surface layer of the fuser element, the method comprising the steps of:
   a) performing a capacitive measurement on the surface layer of the fuser element by the first electrode and the second electrode of the capacitive probe;
   b) determining a characteristic of the surface layer of the fuser element based on the capacitive measurement of step a);
   wherein the capacitive probe further comprises a dielectric surface layer, wherein step a) comprises positioning the dielectric surface layer of the capacitive probe in contact with the surface layer of the fuser element in order to form a capacitor with the dielectric surface layer between both the first electrode and the second electrode of the capacitive probe and the surface layer of the fuser element.

2. The method according to claim 1, wherein step b) comprises determining a thickness of the surface layer of the fuser element based on the capacitive measurement of step a).

3. The method according to claim 1, wherein step b) comprises determining a contamination on the surface layer of the fuser element based on the capacitive measurement of step a).

4. The method according claim 1, wherein the fuser element is rotatably arranged around an axis and wherein step a) comprises performing a plurality of capacitive measurements perpendicular to an axial direction of the fuser element while rotating the fuser element around the axis.

5. The method according claim 1, wherein the capacitive probe comprises at least three electrodes, wherein the at least three electrodes are in operation distributed along an axial direction of the fuser element, and wherein step a) comprises performing a plurality of capacitive measurements along the axial direction of the fuser element, wherein each of the plurality of capacitive measurement is being performed by two adjacent electrodes of the at least three electrodes.

6. The method according claim 1, wherein step a) comprises step a1) moving the capacitive probe and the fuser element relative to each other in an axial direction of the fuser element and step a2) performing a plurality of capacitive measurements along the axial direction of the fuser element.

7. A printing system for providing a marking material on a recording medium comprising:
   a fuser element comprising a surface layer for fusing the marking material on the recording medium;
   a capacitive probe, the capacitive probe comprising a first electrode and a second electrode, the second electrode being arranged adjacent to the first electrode in order to form a capacitor, the first electrode and the second electrode in operation both being arranged adjacent to and opposing the surface layer of the fuser element; and
   a capacitance measuring circuit for performing a capacitive measurement on the surface layer of the fuser element, the capacitance measuring circuit being operatively coupled to the first electrode and the second electrode of the capacitive probe, wherein the capacitive probe comprises a dielectric surface layer, the dielectric surface layer in operative condition being engaged against the surface layer of the fuser element.

8. The printing system according to claim 7, wherein the capacitive probe comprises at least three electrodes, the at least three electrodes in operative condition being distributed along an axial direction of the fuser element.

9. The printing system according to claim 8, wherein the printing system further comprises an image forming element, wherein the capacitive probe is configured for in printing operation image-wise developing the marking material on a surface of the image forming element by providing a potential on each of the at least three electrodes of the capacitive probe.

10. The printing system according to claim 7, wherein the printing system further comprises a capacitive probe scanning device, which is configured for in operation moving the capacitive probe along an axial direction of the fuser element.

11. The printing system according to claim 7, wherein the fuser element is an intermediate image transfer element configured for, in operation of the printing system, transferring the marking material to the recording medium.

12. The printing system according to claim 7, wherein the surface layer of the fuser element comprises an elastomeric material.

* * * * *